United States Patent [19]
Godbersen

[11] 3,774,790
[45] Nov. 27, 1973

[54] BOAT TRAILER

[76] Inventor: Byron Leroy Godbersen, 710 Circle Dr., Ida Grove, Iowa

[22] Filed: July 19, 1971

[21] Appl. No.: 163,818

[52] U.S. Cl. .................. 214/84, 193/35 SS, 193/42
[51] Int. Cl. ............................................. B60p 1/52
[58] Field of Search ............... 214/84, 6 BA, 6 DK; 193/35 SS, 42

[56] References Cited
UNITED STATES PATENTS

| | | | |
|---|---|---|---|
| 3,175,710 | 3/1965 | Kistner | 214/84 |
| 3,173,558 | 3/1965 | Futch | 214/84 |
| 3,343,694 | 9/1967 | Kurki | 214/6 BA X |
| 3,415,389 | 12/1968 | Smith | 214/6 DK X |
| 2,836,278 | 5/1958 | Kindell | 214/84 X |
| 3,203,563 | 8/1965 | Blatchford | 214/84 |

Primary Examiner—Albert J. Makay
Attorney—Henderson & Strom

[57] ABSTRACT

A two-wheel trailer for transporting boats including longitudinally spaced and aligned keel rollers serving in conjunction with transversely parallel, longitudinally extended bunks for supporting a boat in transport position, and including a vertically movable roller mounted at the rear of the trailer for lifting the boat off the bunks by a combined rotary, hinged action of a lift handle, the latter retained in place by in one position by a conventional trailer light bracket.

3 Claims, 5 Drawing Figures

PATENTED NOV 27 1973  3,774,790

INVENTOR
BYRON G. GODBERSEN
BY
Henderson & Strom
ATTORNEYS

BOAT TRAILER

BACKGROUND OF THE INVENTION

In using trailers of the type involved, for transporting boats of lengths approximating 16 – 19 feet, one of the main problems to the user is the ease of loading and unloading the boat. For proper transport, the boat must be cradled within the trailer, and such cradling requires the provision of stationary elements, such as elongated bunks. To load a boat upon the trailer, several rollers may be placed along the longitudinal axis of the trailer, and a winch may be provided at the front of the trailer for aiding in pulling the boat forwardly over the rollers and the bunks until it is properly located upon the trailer. The bunks and rollers thus form an appropriate cradle within which the boat nests during transport and non-use.

The difficulty comes in unloading the boat, for the winch is of no aid, and the bunks have a sufficient frictional grab upon the boat to prevent the user from merely pushing the boat, particularly if if has any weight over several hundred pounds, rearwardly off the trailer. Many methods have been tried, such as by backing the trailer into the water and then floating the boat off, or by tilting the entire trailer upwardly at the front and about the wheels as a fulcrum until the boat slides off due to its own weight. Applicant is also aware of provision on some boat trailers for raising and lowering one of the bunks to reduce part of the frictional drag on the boat.

Accordingly, there is a need for a more effective mechanism for releasing the frictional grab of the trailer on the boat such that the boat may be easily pushed off the trailer without the need of exerting brute strength for pushing and/or lifting, and obviating the need for floating the boat off the trailer.

SUMMARY OF THE INVENTION

The invention comprises a trailer for transporting boats, which trailer includes a frame supported at its rear end by a pair of laterally spaced wheels and attachable at its front end to a vehicle; a plurality of rollers placed along the longitudinal axis of the frame in longitudinally spaced relation for supporting and guiding the keel of a boat; a winch unit for aiding the operator in pulling the boat onto the trailer and over the rollers; bunks on either side of the rollers for supporting the boat in a nested manner when it is resting on the trailer; and a lift roller mounted on the trailer at the rear in longitudinal alignment with the other rollers and in an offset manner on its shaft such that in one position the roller is at a height equal to the other rollers, but in another position the roller is at a height above the other rollers thereby raising the boat about a forward roller as a fulcrum and above the bunks whereby the boat may be readily moved off the trailer.

It is, therefore, an object of this invention to provide a new and novel trailer of the type described herein.

It is another object of this invention to provide a boat trailer wherein the boat may easily be unloaded from the trailer without tipping of the trailer or submerging of the trailer.

It is yet another object of this invention to provide a boat trailer wherein a unit for aiding in unloading the boat utilizes a conventional part of the trailer, namely a tail light, for locking a part of the unit in one position of operation.

Still another object of this invention is the attainment of the aforementioned objectives by a structure which is economical of manufacture, effective in operation, and easily serviced.

These objects and other features and advantages will be readily observed from the following description of the invention and the accompanying drawings.

DESCRIPTION OF THE PREFERRED EMBODIMENT

Figure 1:
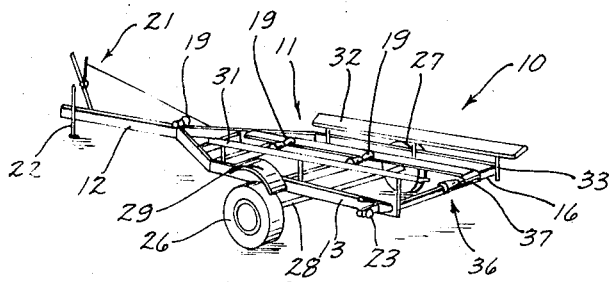
FIG. 1 is a perspective view of the boat trailer of this invention.
Figure 2:
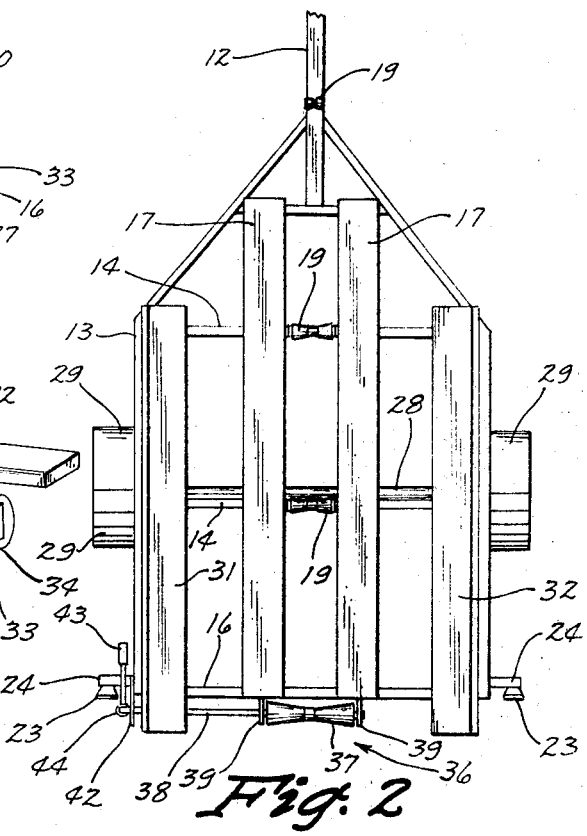
FIG. 2 is an enlarged top plan of the trailer of FIG. 1, the winch end of the tongue not showing.

Referring to the drawings, the boat trailer of this invention is illustrated generally at 10 in FIG. 1 and comprises a frame assembly 11 including an elongated tongue 12, the forward end of which is adapted by any conventional means for a hitching connection to a prime mover such as a car or light truck, the frame 11 including further angular side members 13 which extend outwardly and rearwardly from a forward connection with the tongue 12, which side members 13 are interconnected by lateral members 14 and an end member 16 (FIG. 2).

A pair of elongated walkways 17 are mounted on the laterals 14 and the end member 16 in parallel, longitudinal relation on either side of the longitudinal axis of the trailer 10. The forward end of the walkways 17 are mounted on a front lateral 18 shorter than the other laterals 14.

Mounted on the tongue 12 and the two laterals 18 are a trio of rollers 19 mounted in longitudinally spaced relation and along the longitudinal axis of the trailer 10 for the purpose of rollably supporting the keel (not shown) of a boat.

At the forward end of the tongue 12 a conventional winch assembly 21 is provided for connecting to the front of the boat so as to enable the operator to pull a boat onto the boat trailer 10 and over the rollers 19. A jack assembly 22, also of a conventional nature, is provided at the front of the trailer 10 for the purpose of supporting the trailer 10 in a horizontal position while not connected to a prime mover. The trailer is also provided with conventional tail lights 23 (FIG. 2) mounted by means of brackets 24 to the rear and sides of the side members 13.

The rear end of the trailer is mounted on a pair of ground engaging wheels 26 and 27 interconnected by an axle 28 and covered by fenders 29 of a conventional nature.

For the purpose of aiding and supporting a boat while on the trailer 10, a pair of elongated bunks 31 and 32 (FIGS. 1 and 2) are mounted in parallel relationship along the outer sides of the trailer and on either side of the longitudinal axis thereof such that when a boat is rolled unto the trailer 10, the sides of the hull of the boat rest upon the bunks 31 and 32, thereby giving the boat excellent support in transport and non-use conditions. The vertical positions of the bunks 31 and 32 are determined by a plurality of supports 33 connected by brackets 34 to the frame 11, with the upper end of the supports 33 pivotally connected at 35 to the underside of the bunks 31 and 32. By this arrangement, the bunks may be adjusted vertically and also angularly relative to the hull of the boat for proper support thereof.

To aid in unloading a boat from the trailer 10, a lift assembly 36 (FIGS. 2 and 3) is provided, which lift assembly 36 includes a lift roller 37 mounted in an offset manner onto an elongated shaft 38, which shaft is rotatably mounted in a pair of end brackets 39 affixed to the end member 16.

Figure 3:
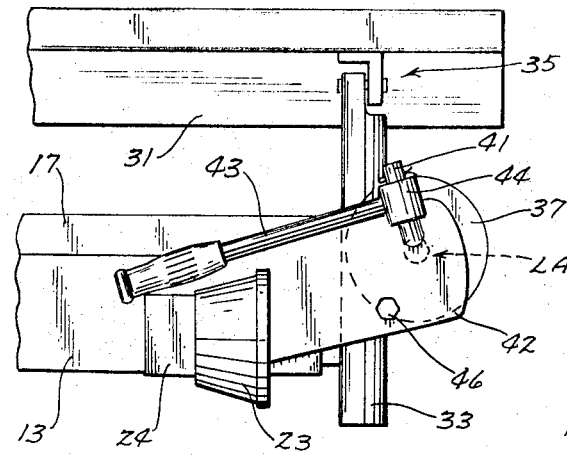
FIg. 3 is a fragmentary perspective view of the trailer.

An outer end 41 of the shaft 38 extends beyond the side member 13 at the left rear corner of the trailer, being rotatably extended through a side bracket 42, and is bent at right angles to the main extent of the shaft 38 as clearly shown in FIG. 3. Rotatably connected to the end 41 of the shaft is a handle 43 (FIGS. 4 and 5), a journal 44 being provided at the inner end of the handle 43 for rotatable connection with the shaft end 41. The lift assembly 36 is completed by the provision of a bolt 46 (FIG. 3), which bolt 46 extends straight outwardly from its connection on the side bracket 42 at approximately a seven o'clock position thereon relative to the rotational mounting of the handle 43 with the bracket 42.

Figures 4, 5:
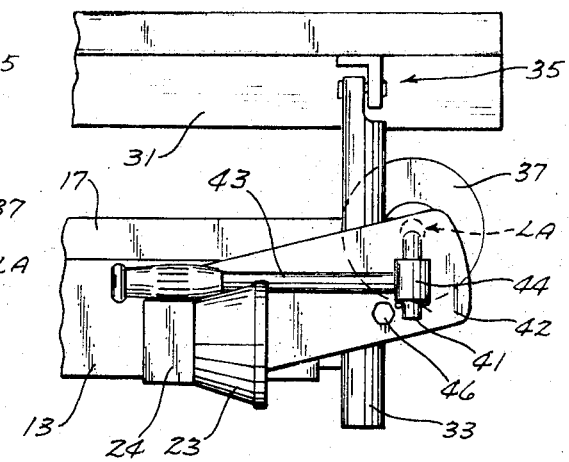
FIG. 4 is a fragmentary side elevational view of the left rear end of the trailer, and showing the boat lift assembly in one position.
FIG. 5 is a view similar to FIG. 4 and showing the boat lift assembly in another position.

Referring to FIGS. 4 and 5, the two positions of the lift roller 37 are clearly shown. In FIG. 4, with the shaft end 41 being in a substantially upward position, the lift roller 37 is on a level with the keel rollers 19 such that the keel (not hown) of a boat would be resting substantially level upon all four rollers 19 and 37. In this position of the lift roller, it will be noted that the longitudinal axis of the lift roller 37, indicated by the letters LA in FIG. 4, is below the longitudinal axis of the shaft 38. The lift roller 37 is therefore in a stable position, and readily rotatable about the shaft 38 due to movement of a boat fore or aft thereon.

To raise the rear end of a boat sufficiently to lift the boat off the bunks 31 and 32, thereby enabling a boat to be readily rolled off the trailer 10, the handle 43 is merely pivoted 180° about its connection at 44 (FIG. 4) with the shaft end 41, then the handle 43 is rotated in a clockwise direction as one views FIG. 4 until the shaft end 41 engages the stop bolt 46, an arc of approximately 180°, and the handle 43 is poised above the tail light bracket 24. The handle 43 is then permitted to drop slightly until it engages the bracket 24. Thus, any tendency of the shaft 38, due to the weight of the boat, to rotate in a counterclockwise direction as viewed in FIG. 5 is prevented by the bracket 24 limiting rotation of movement of the handle 43; and any tendency of the shaft 38 to rotate in a clockwise direction as is viewed in FIG. 5 is prevented by the stop bolt 46 being intermediate the bracket 24 and the shaft end 41, thus in the path of movement of the shaft end 41.

The lift roller 37 remains in the position of FIG. 5, therefore, during both unloading of a boat and the reloading; enabling the hull of the boat to clear the bunks 31 and 32 which would create a frictional drag on the hull were they to contact same of a sufficient nature that unloading, for example, could be most difficult. Once a boat is reloaded onto the trailer, the lift roller 37 may be repositioned to its transport position level with the other rollers 19 by merely raising the handle 43 slightly in a clockwise direction as viewed in FIG. 5 until the shaft end 41 engages the stop bolt 46 at which position the handle 43 can be rotated approximately 180° in a horizontal plane about its journal connection with the shaft end 41, and then rotated in a substantially vertical plane another 180° back to its position of FIG. 4. It will be noted from FIG. 2 particularly that the lift roller 37 is, along with the other rollers 19, located on the longitudinal axis of the trailer 10. It can thus be seen that the lift assembly 36 is quite simple in construction and operation, yet very rugged in service, effecting its purpose with a minimum of moving parts.

Although only one embodiment of the invention has been described herein, various modifications and alterations of parts of the invention can be readily envisioned which would be the full equivalent of the parts specifically illustrated and described herein such that they too would come within the confines of the invention disclosed herein.

I claim:

1. A trailer for carrying a boat or the like comprising:
   a frame having a forward end adapted to be detachably connected to a prime mover;
   transversely spaced wheels mounted to the rear of said frame;
   a plurality of rollers mounted in longitudinally spaced relation along the longitudinal axis of said frame for movably supporting a boat upon said frame;
   elongated stationary members placed on either side of the longitudinal axis for also supporting a boat in conjunction with said rollers;
   winch means mounted at the forward end of said frame for releasable engagement with a boat, said winch means capable of pulling a boat from the rear of said frame toward said forward end; and
   means mounted at the rear of said frame and operable to move the boat from a position resting upon said stationary members to a position raised above said stationary members, said boat raising means comprising an elongated lift roller mounted transversely to ane on the longitudinal axis of said frame, said roller mounted offset relative to its longitudinal axis;
   and further wherein a stop light is mounted to one side of said frame at the rear thereof, and wherein a handle is pivotally connected to said lift roller for movement in a plane perpendicular to the longitudinal axis of aid lift roller, said handle extendable over said stop light whereby said stop light limits movement of said handle in one direction.

2. A trailer as described in claim 1, and further wherein stop means is secured to said frame for limiting movement of said pivotal connection in a direction opposite said one direction.

3. A trailer as described in claim 2, and further wherein in the raised position of said lift roller, said handle is extendable forwardly of its pivotal connection relative to said trailer, with said stop light disposed below said handle to prevent rotation of said handle and said lift roller in one direction, and with said stop means disposed intermediate said stop light and said pivotal connection to limit rotation of said handle and said lift roller in an opposite direction, whereby said lift roller is substantially locked in a raised position.

* * * * *